United States Patent [19]
Tylec

[11] Patent Number: 5,452,027
[45] Date of Patent: Sep. 19, 1995

[54] TYLEC OPTICAL OCCLUDERS FOR CORRECTING DOUBLE VISION

[76] Inventor: David E. Tylec, 3165-1030 Hidden Pond Dr., Raleigh, N.C. 27613

[21] Appl. No.: 2,667

[22] Filed: Jan. 11, 1993

[51] Int. Cl.⁶ .............................................. G02C 7/16
[52] U.S. Cl. ......................................... 351/46; 351/45
[58] Field of Search ....................... 351/45, 46, 41, 51, 351/52, 163, 164, 165, 158, 47, 57

[56] References Cited

U.S. PATENT DOCUMENTS

| | | | |
|---|---|---|---|
| 1,876,769 | 9/1932 | Sheffield . | |
| 2,511,776 | 6/1950 | Kelly | 351/45 |
| 2,895,376 | 7/1959 | Linder, Jr. | 88/20 |
| 3,421,233 | 1/1969 | Gaal | 35/35 |
| 3,628,854 | 12/1971 | Jampolsky | 351/175 |
| 3,838,913 | 10/1974 | Schwartz | 351/47 |
| 4,761,196 | 8/1988 | Brown et al. | 156/247 |
| 4,790,643 | 12/1988 | Grandiere | 351/45 |
| 4,828,380 | 5/1989 | Cherian | 351/45 |

OTHER PUBLICATIONS

Sir Stewart Duke-Elder and Kenneth Wybar, *System of Ophthalmology*, vol. VI, *Ocular Motility and Strabismus* (1973) pp. 510–511).
Monocular Central-Field Occlusion for Intractable Diplopia, vol. 54, No. 5, 325–331 (May, 1977) pp. 327–328.
*Binocular Anomalies—Procedures for Vision Therapy* (Professional Press, Inc., 1982) pp. 156–158.
*Occlusion Contact Lenses* (Univ.-Augenklinik Homburg, 1979) p. 577.
*A Four Year Retrospective Study of Prosthetic Hydrogel Lens Use*, vol. 11, No. 3 (Mar. 1984) p. see final page of Article.
*A New Cosmetic Piggyback Technique for Disfigured Corneas*, vol. 6, No. 4, 400 (Oct./Dec. 1980) p. 401.

"Facts and Issues", by National Multiple Sclerosis Society, May, 1988.
Multiple Sclerosis, 2nd Ed., "A Guide for Patients and Their Families", Editor—Labe C. Scheinberg, Sep. 16, 1988, pp. 26–27.

*Primary Examiner*—William L. Sikes
*Assistant Examiner*—Hung Xuan Dang
*Attorney, Agent, or Firm*—Trapani & Molldrem

[57] ABSTRACT

There is provided an apparatus for treating individuals suffering from binocular diplopia. The apparatus comprises a frame, having first and second viewing lenses, and includes a mechanism for supporting the frame in an operative position relative to the individual such that the first and second lenses are in front of the left and the right eyes respectively. Each eye of the individual is considered as having a range of vision defined by left and right fields of view. A first occluding device is associated with the first viewing lens, for occluding at least a portion of the right field of view of the left eye. A second occluding device is associated with the second viewing lens, for occluding at least a portion of the left field of view of the right eye. In this arrangement, monocular vision is substantially achieved alternately between the left and right eyes as the eyes scan to the left and right respectively. Methods for treating an individual suffering from monocular and binocular diplopia are also contemplated by the present invention. One such method includes (1) supporting first and second lenses in an operative position relative to the individual such that the first and second lenses are located in front of the first and second eyes of the individual respectively; and (2) occluding an intended line of sight of the first eye by affixing an occluder onto the first lens. Monocular vision is achieved over a complementary line of sight of the second eye.

24 Claims, 5 Drawing Sheets

TYLEC OPTICAL OCCLUDERS FOR CORRECTING DOUBLE VISION

BACKGROUND OF THE INVENTION

1. Technical Field

The present invention relates generally to ophthalmic aids and procedures for correcting double vision or "diplopia" and, more particularly, to apparatus and methods of treating monocular or binocular diplopia by partial occlusion of vision.

2. Background Art

"Diplopia" is a disorder of vision which causes objects to appear double. When diplopia originates from a single eye, it is referred to as "monocular diplopia." A more common disorder is "binocular diplopia," which results from an imbalance in the muscles that move both eyes. The present invention encompasses embodiments for treating both types of diplopia.

Monocular diplopia is extremely rare and usually indicates a functional problem with the eye which produces a refractive error. Binocular diplopia occurs when both eyes do not move together in a coordinated manner. In such case, each eye is not seeing the same thing at the same time.

As explained in an article entitled: "Differential Diagnosis of Vision Loss," written by Jean E. Holt, M.D. and John B. Selhorst, M.D., published in "Patient Care", dated Jan. 30, 1987 (p. 62), diplopia can result from head trauma or a serious underlining disorder, such as a nerve palsy of the external eye muscles. Diseases that cause nerve palsy and the resulting imbalance of the eye muscles include multiple sclerosis, diabetes, thyroid disease, and myasthenia gravis. Diplopia may also result, for example, from aneurysms, brain tumors, head trauma, and meningitis.

Multiple Sclerosis (MS) patients are frequent sufferers of binocular diplopia. A prominent neurologist, John K. Wolf, M.D., from the Department of Neurology, at the State University of New York, Health Science Center, Syracuse, New York, has explained how diplopia is caused in MS patients, in his book entitled "Mastering Multiple Sclerosis" (2nd Ed.), page 315. Dr. Wolf teaches that a small tract in the brain stem coordinates movements of the eyes when looking to the left or to the right. This region of the brain stem often accumulates MS plaques, which interrupts coordinated movements of the eyes, and prevents the eyes from turning precisely together. The result is that the MS sufferer sees a double image.

Aside from treating the underlining cause of diplopia, doctors have had (to applicant's knowledge) only two devices at their disposal to treat its symptoms. These devices are an eye patch and Fresnel prisms. The eye patch is used in treating monocular diplopia by simply covering the affected eye. With binocular diplopia, the eye patch covers one eye, and thus eliminates one of the images received in the brain. Fresnel prisms operate to refract images received from one or both eyes.

The eye patch has certain obvious drawbacks, in that it blocks all vision from an eye that still has important sight capability. For example, peripheral vision from the patched eye is lost. In addition, the ability to look to the side on which the covered eye is located ("side vision"), is substantially impaired, because vision is established only from the eye located on the other side. Such loss of side vision is unnecessary, particularly in the case of binocular diplopia, as will become apparent from reading the description of the present invention hereinbelow. Another drawback with the eye patch is that it is cosmetically unacceptable to many individuals.

As for Fresnel prisms, it is applicant's understanding that such devices are not suitable in cases where the symptoms of diplopia are constantly changing. This is the usual case for MS sufferers, where vision is affected by heat, lighting, illness, fatigue and emotional state. Accordingly, the application of Fresnel prisms are limited. Another drawback with Fresnel prisms is that, they too are perceived by many as cosmetically desirable.

SUMMARY AND OBJECTS OF THE INVENTION

It is therefore an object of the present invention to provide apparatus and methods for treating diplopia that avoid the problems associated with the prior art.

It is another object of the present invention to provide apparatus and methods for treating diplopia by effecting monocular vision alternately from each eye for certain desired lines of sight.

It is a further object of the present invention to provide apparatus and methods for treating diplopia which preserve peripheral and side vision through the novel use of partial occluders.

It is yet another object of the present invention to provide apparatus and methods for treating diplopia that minimize eye strain and mental fatigue caused by the reception of dual images.

It is yet a further object of the present invention to provide apparatus and methods for treating diplopia that are inconspicuous and cosmetically acceptable.

It is still another object of the present invention to provide methods of applying apparatus for treating diplopia which include the use of kits containing partial occluders.

These and other objects are attained in accordance with the present invention wherein there is provided, for example, an apparatus for treating an individual suffering from binocular diplopia. The apparatus comprises a frame, having first and second viewing lenses, and includes a means for supporting the frame in an operative position relative to the individual such that the first and second lenses are in front of the left and right eyes respectively. Each eye of the individual has a range of vision defined by left and right fields of view. The left and right fields of view of each eye are divided by an imaginary latitudinal plane, positioned along a forward line of sight. A first occluding means is associated with the first viewing lens, for occluding at least a portion of the right field of view of the left eye. The left field of view and the forward line of sight of the left eye remain substantially unoccluded. A second occluding means is associated with the second viewing lens, for occluding at least a portion of the left field of view of the right eye. The right field of view and the forward line of sight of the right eye remain substantially unoccluded. In this arrangement, monocular vision is substantially achieved alternately between the left and right eyes as the eyes scan to the left and right respectively.

Methods for treating an individual suffering from diplopia are also contemplated by the present invention. One such method comprises the steps of (1) supporting first and second viewing lenses in an operative position relative to the individual such that the lenses are located in front of the eyes of the individual; and (2) occluding an intended line of sight of one eye by affixing a partial occluder onto the first lens, at an appropriate location. Monocular vision is achieved over a complementary line of sight of the other eye.

Another method is directed to treating monocular diplopia. This method comprises the steps of: (1) supporting first and second viewing lenses in an operative position relative to an individual such that the first and second lenses are located in front of the diplopic eye and the other eye respectively; and (2) occluding an intended line of sight of the diplopic eye by affixing a partial occluder onto the first lens at an appropriate location. Monocular vision is achieved over a complementary line of sight of the other eye.

A further method is directed to treating binocular diplopia. This method comprises the steps of: (1) occluding at least a portion of the right field of view of the left eye; and (2) occluding at least a portion of the left field of view of the right eye. Monocular vision is achieved alternately between the left and right eyes as the eyes scan to the left and right respectively.

In yet another method for treating binocular diplopia, the steps include: (1) selecting a first self-adhering partial occluder and affixing it to the left lens of a pair of eyeglasses, at a location considered suitable for occluding an intended portion of the right field of view of the left eye; (2) selecting a second self-adhering partial occluder and affixing it to the right lens of the eyeglasses, at a location considered suitable for occluding an intended portion of the left field of view of the right eye; and (3) adjusting, if necessary, the locations of the first and second self-adhering occluders on the left and right lenses respectively until monocular vision is substantially achieved through the eyeglasses, for intended left and right lines of sight.

This method may further comprise the steps of: (4) selecting a first adhesive partial occluder; (5) affixing the first adhesive occluder to the left lens on a surface opposite of the surface to which the first self-adhering occluder is affixed, and coincident with the first self-adhering occluder; (6) selecting a second adhesive partial occluder; (7) affixing the second adhesive occluder to the right lens on a surface opposite of the surface to which the second self-adhering occluder is affixed, and coincident with the second self-adhering occluder; and (8) removing the first and second self-adhering occluders from the left and right lenses.

In still another method of treating diplopia, the steps include: (1) selecting a self-adhering partial occluder of a certain size and shape; (2) affixing the self-adhering occluder to one lens of a pair of eyeglasses, at a location considered suitable for occluding an intended line of sight of one eye of an individual being treated; and (3) adjusting, if necessary, the location of the self-adhering occluder on the one lens until monocular vision is achieved through the other lens of the eyeglasses, for an intended line of sight of the other eye of the individual.

This method may further comprise the steps of: (4) selecting an adhesive partial occluder having the same size and shape as the self-adhering occluder; (5) affixing the adhesive occluder to the one lens on a surface opposite of the surface to which the self-adhering occluder is affixed, and coincident with the self-adhering occluder; and (6) removing the self-adhering occluder from the one lens.

BRIEF DESCRIPTION OF THE DRAWINGS

Further objects of the present invention will become apparent from the following description of the preferred embodiments with reference to the accompanying drawings, in which.

DESCRIPTION OF THE PREFERRED EMBODIMENTS

Figures 1, 2:
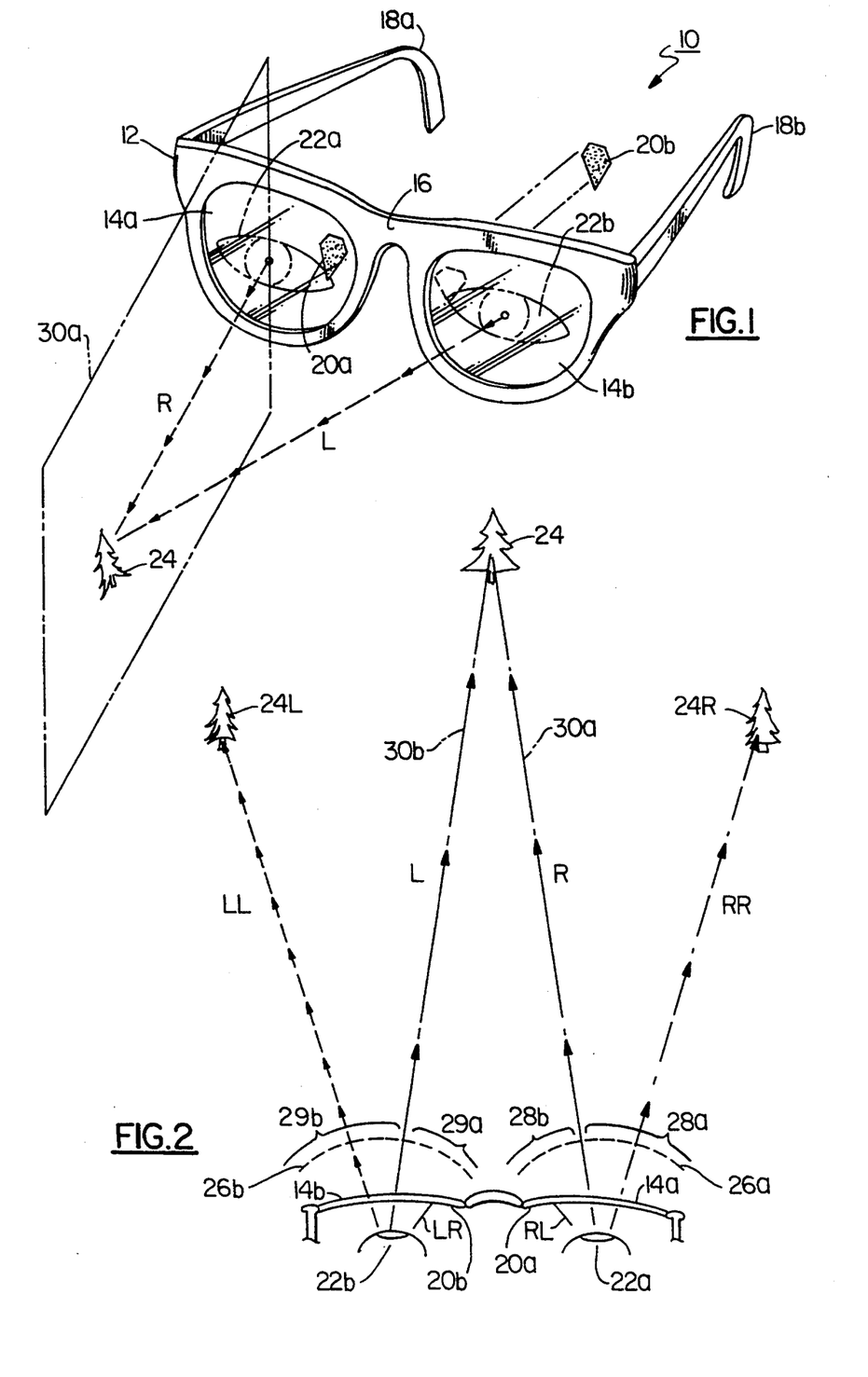
FIG. 1 is a perspective view of a pair of eyeglasses modified in accordance with the present invention for treating binocular diplopia.
FIG. 2 is a diagram illustrating the principles of operation of the embodiment shown in FIG. 1.

With reference to FIG. 1, there is shown a pair of eyeglasses 10, modified in accordance with the present invention for treating binocular diplopia. Apparatus 10 comprises a conventional eyeglasses frame 12, having a pair of viewing lenses 14a and 14b, a nose bridge 16, and a pair of ear bows 18a and 18b. A pair of cut diamond-shaped partial occluders 20a and 20b are affixed to the surfaces of lenses 14a and 14b respectively.

As used herein, the terms "lens" or "lenses" are intended to have their usual and traditional meanings and, in addition, include within their meanings any substantially transparent element, whether or not it refracts light rays. For example, an uncorrected, flat piece of glass or plastic is also considered a lens for the purposes of this application. The construction of lenses and the materials used are well known and will not be described herein.

In the preferred embodiment, partial occluders 20a and 20b are configured in a cut diamond shape, as shown in FIG. 1. Occluders 20a and 20b should be large enough to disrupt the image forming process in the eye. The actual size of the occluder may vary from one individual to another. For applicant, the optimum size of the cut diamond shape occluder is about 7/16ths of an inch in height and about 7/16ths of an inch in width (at the largest dimension). The cut diamond shape is preferred because it provides both wide and narrow areas of occlusion, each of which can be used separately for different visual operations. For example, the wide portion of occluders 20a and 20b are conveniently used when the eyes are glancing quickly to the left or right. The narrow portion or tip is expedient when the eyes are focusing on a subject for an extended length of time, such as when threading a needle or performing other detailed manual work. The cut diamond shape also has a reduced profile, and is thus less conspicuous than other standard shapes. These advantages may also be realized with a triangular-shaped occluder. However, applicant has found that the sharp corners at the edges of the triangle lift up and curl after a relatively short period of use.

Occluders 20a and 20b are constructed from a thin, flexible piece of translucent material, such as frosted appliqué film sold under various trade names, one of which is Vis-I-Blok Type III, manufactured by Charrette, Inc. Frosted appliqué film can be easily cut to the appropriate size and shape. The film includes an adhesive coating on one side, which is suitable for affixing an occluder to a glass or plastic lens. In production, the occluders will be die cut from a suitable stock material. Translucent Mylar ® may also be a suitable material for occluders 20a and 20b, provided that a compatible adhesive is available. A translucent material is chosen because it is less conspicuous than an opaque material, and because it permits light to pass through to the eye. This latter reason is important for minimizing any disturbance the occluder might cause to the eye.

In an alternative preferred embodiment, occluders 20a and 20b are made from a conformable, self-adhering translucent material, such as, for example, a vinyl butyrate. The specification for this material, and its equivalents, are provided in U.S. Pat. No. 3,628,854 (1971) to Jampolsky, the contents of which are incorporated herein by reference.

The operational parameters of apparatus 10 are now described with reference to FIGS. 1 and 2. As shown in FIG. 1, apparatus 10 is supported in an operative position so that lenses 14a and 14b are in front of a right eye 22a and a left eye 22b respectively of an individual. Apparatus 10 is supported in this position by bridge 16 resting over the bridge of the individual's nose, and by ear bows 18a and 18b engaging the individual's ears in the usual manner. As shown in FIGS. 1 and 2, eyes 22a and 22b are focused on a subject 24 that is directly forward of the individual (i.e., in the plane of symmetry of the face). Consequently, eyes 22a and 22b are focused along lines of sight R and L respectively (See FIG. 2). Lines of sight R and L are referred to as "forward lines of sight" because eyes 22a and 22b are focusing on an object that is directly in front of the individual.

Eyes 22a and 22b each have a range of vision which encompasses all possible lines of sight for the eye. The ranges of vision for eyes 22a and 22b are symbolically represented in FIG. 2 by hemispheric regions 26a and 26b respectively. For purposes of describing the preferred embodiment of the present invention, ranges of vision 26a and 26b are each divided into left and right fields of view. As shown in FIG. 2, range 26a comprises a right field of view 28a and a left field of view 28b. Range 26b comprises a right field of view 29a and a left field of view 29b.

As shown in FIGS. 1 and 2, fields of view 28a, 28b and 29a, 29b are defined by the intersection of ranges 26a and 26b with respective imaginary planes 30a and 30b. In general, each plane is always latitudinally oriented with respect to the head (e.g., vertical, if the individual's head is positioned upright), and disposed along a respective forward line of sight. As seen from FIG. 1, imaginary plane 30a is oriented vertically and positioned along forward line of sight R. As shown in FIG. 2, plane 30a defines right and left fields of view 28a, 28b, as it intersects range 26a. Similarly, vertically oriented plane 30b is positioned along forward line of sight L, and defines right and left fields of view 29a, 29b, as it intersects range 26b.

With these concepts in mind, the operational locations of partial occluders 20a and 20b, on lenses 14a and 14b, can be specified for correcting binocular diplopia. In the preferred embodiment, occluder 20a is affixed to the proximal surface (i.e., the surface closest to the eye) of lens 14a at a location that will occlude at least a portion of vision in left field of view 28b (see FIG. 2). Right field of view 28a remains unoccluded to preserve peripheral and side vision from right eye 22a. Occluder 20b is affixed to the proximal surface of lens 14b at a location that would occlude at least a portion of vision in right field of view 29a (see FIG. 2). Left field of view 29b remains unoccluded to preserve peripheral and side vision from left eye 22b.

To digress a moment, it is applicant's understanding that many individuals suffering from binocular diplopia are able to properly receive a composite image when focusing on subjects that are situated straight ahead of them. However, when focusing to the left or to the right, double vision is experienced. Therefore, apparatus 10 has been designed to eliminate double vision along desired left and right lines of sight by effecting monocular vision along these lines of sight.

The operation of apparatus 10 is illustrated in FIG. 2. As eyes 22a and 22b glance to the right to focus on a subject 24R, a right line of sight RR for eye 22a is established. The corresponding line of sight LR for eye 22b is occluded by occluder 20b, thus producing monocular vision from eye 22a for line of sight RR. Similarly, as eyes 22a and 22b glance to the left to focus on a subject 24L, a left line of sight LL for eye 22b is established. The corresponding line of sight RL for eye 22a is occluded by occluder 20a, thus producing monocular vision from eye 22b for line of sight LL.

As seen from FIG. 2, the novel arrangement of apparatus 10 allows the eye closest to the subject (i.e., the "proximal eye") to see without any obstruction. Vision in left field of view 29b of eye 22b is totally unoccluded, and eye 22b is free to focus on any subject in that field of view. Similarly, vision in right field of view 28a of eye 22a is totally unoccluded, and eye 22a is free to focus on any subject in that field of view. Accordingly, side and peripheral vision are preserved.

Figure 3:
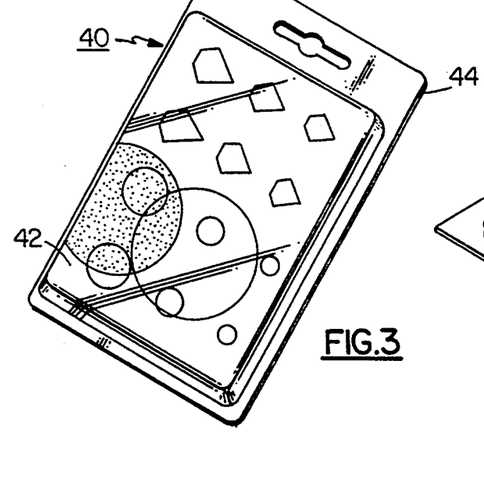
FIG. 3 is a perspective view of a package containing a test kit employed in practicing the present invention.
Figure 4:
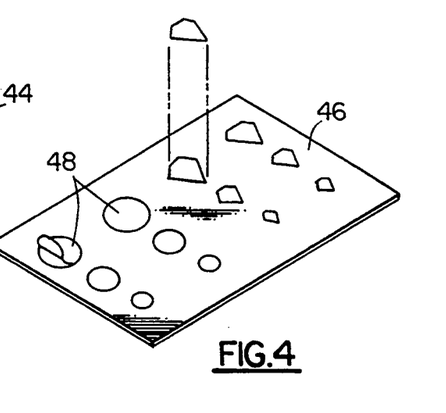
FIG. 4 is a perspective view of the test kit containing partial occluders of different sizes and shapes.

Referring now to FIGS. 3 and 4, there is shown a test kit 40 containing two different shapes of partial occluders in three sizes. Test kit 40 provides an instrumentality for determining, by trial-and-error, the optimum shape, size, and location for the occluders. FIG. 3 shows the package for test kit 40 in a perspective view. The package is of conventional construction, comprising a blister pack 42 which is sealed onto a cardboard backing 44. Inside the package is a card 46 which functions as a substrate or backing for six sets of partial occluders 48 (See FIG. 4). Occluders 48 are of the self-adhering type.

Card 46 should be constructed from a sheet of plastic material. Card 46 may also be made of paper or cardboard if it is coated or laminated with a plastic. Occluders 48 should also be opaque to facilitate selection and alignment of the most appropriate occluders for each individual. A method of utilizing test kit 40 will be described hereinbelow with reference to FIGS. 13 and 14.

Figures 5, 6:
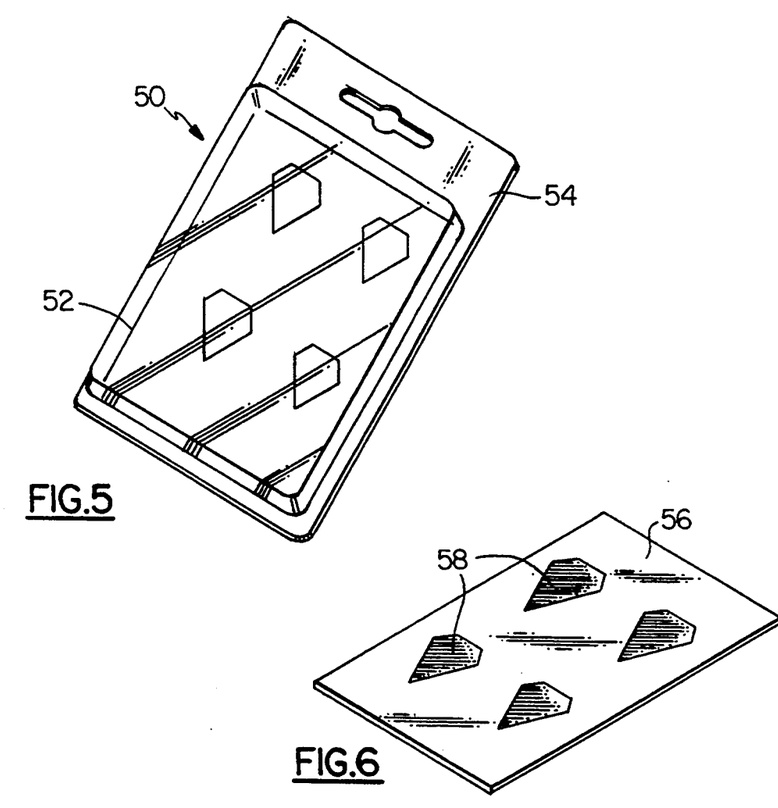
FIG. 5 is a perspective view of a package containing a working kit employed in practicing the present invention.
FIG. 6 is a perspective view of the working kit containing four partial occluders of the same size and shape.

Referring now to FIGS. 5 and 6, there is shown a working kit 50 containing two sets of partial occluders of the same size and shape. Working kit 50 provides a supply of functional occluders, having an optimum size and shape for a particular individual. It is intended that a particular working kit be chosen for an individual after an optimum occluder has been determined from using test kit 40. FIG. 5 shows the package for working kit 50 in a perspective view. The package is of conventional construction, comprising a blister pack 52 which is sealed onto a cardboard backing 54. Inside the package is a card 56 which functions as a substrate or backing for two sets of partial occluders 58 (See FIG. 6).

Occluders 58 may be of the adhesive or self-adhering type, as already described. Card 56 is constructed to accommodate he particular type of occluders used. If occluders 58 are self-adhering, card 56 should be constructed like card 46. If they are adhesive, card 56 should be constructed of paper or cardboard with a wax-like coating for contacting the adhesive side of the occluders. Such a coating allows the occluders to be peeled away from the backing without disrupting the adhesive on the occluders. The preferred shape for occluders 58 is that of a cut diamond, as shown in FIG. 6. In addition, occluders 58 should be translucent for the reasons indicated above with reference to FIGS. 1 and 2. Working kit 50 may also contain a small packet of Isopropyl alcohol swabs and a packet of Acetone to be used in cleaning the surface of the lenses before application, and to remove the occluders when necessary. The use of kit 50 will be further described hereinbelow with reference to FIGS. 13 and 14.

Figure 7:
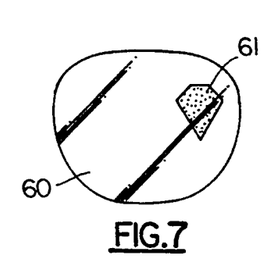
FIGS. 7–9 are elevation views of a lens containing a partial occluder configured in a recognizable geometric shape, i.e., a cut diamond, a circle and a rectangle respectively.
Figure 8:
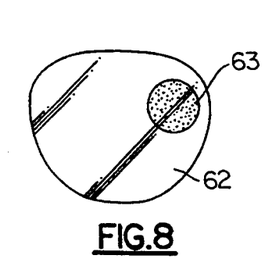
Figure 9:
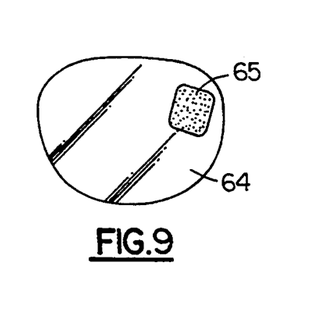

Referring to FIGS. 7-9, there is shown representative shapes for the partial occluders used in accordance with the present invention. FIG. 7 shows a lens 60 having affixed thereto a cut diamond-shaped occluder 61. FIG. 8 shows a lens 62 having affixed thereto a circular-shaped occluder 63. Finally, FIG. 9 shows a lens 64 having affixed thereto a rectangular-shaped occluder 65. Other common shapes, including decorative shapes, may be considered suitable, such as crosses, hearts, and pumpkins. It is preferable that the partial occluders take on a recognizable geometric shape in order to present an acceptable appearance.

Figure 10:
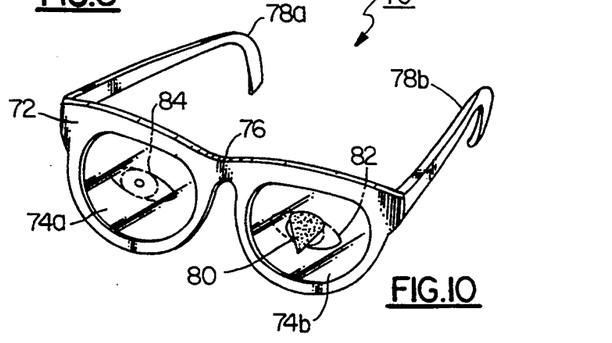
FIG. 10 is a perspective view of a pair of eyeglasses modified in accordance with the present invention for treating both binocular and monocular diplopia.

In another embodiment of the present invention, a single occluder is used on only one lens. As shown in FIG. 10, a pair of eyeglasses 70 is shown comprising a frame 72, a pair of lenses 74a and 74b, a nose bridge 76 and a pair of ear bows 78a and 78b. Affixed to the central area of lens 74b is an occluder 80, as shown in FIG. 10. Occluder 80 functions to occlude a portion of the range of vision of a left eye 82. The vision from a right eye 84 is totally unoccluded. Occluder 80 may be positioned at a precise location on lens 74b to occlude a particular line of sight (including a forward line of sight) of left eye 82, and produce monocular vision from right eye 84 over a complementary line of sight.

Alternatively, occluder 80 may be positioned at any convenient location on lens 74b. With this arrangement, monocular vision can be established for a desired line of sight by positioning the head (and thus, eyeglasses 70) so that the line of sight of eye 82 is occluded and the line of sight of eye 84 is on the desired subject. The use of a single occluder is adequate and convenient for such activities as reading or watching TV. If the individual is required to wear bifocals, the occluder may be located on a near focal length lens of the bifocals for reading. In addition, the embodiment of FIG. 10 is preferred in cases where double vision is experienced while focusing along forward lines of sight.

The embodiment shown in FIG. 10 is also suitable for treating an individual Suffering from monocular diplopia. In this case, occluder 80 is placed on the lens associated with the diplopic eye. As with treating binocular diplopia, occluder 80 occludes a particular line of sight of the diplopic eye and produces monocular vision from the other eye along a complementary line of sight.

Figure 11:
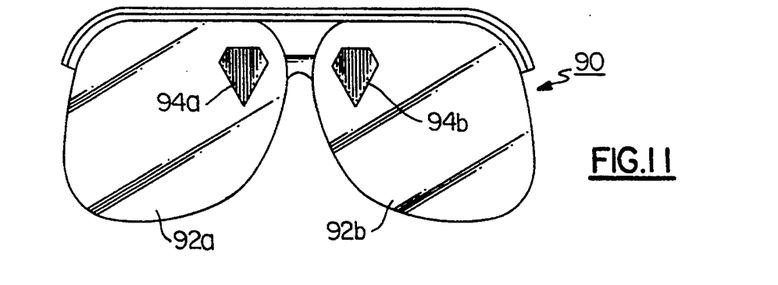
FIG. 11 is an elevation view of a pair of eyeglasses modified in accordance with the present invention for treating binocular diplopia, schematically showing the occluding regions as any one of several alternative constructions.

The present invention is not limited to apparatus and methods utilizing "stick-on" occluders. It is within the scope of the present that the occluders be a part of the lens construction. By way of example and not limitation, the occluders could be integrally molded with the lens, as with certain bifocal constructions. In addition, an occluding area may be constructed on the lens by machining, embossing, or grinding. In another construction, the occluding area may be printed onto the lens using an ink that is compatible with glass or plastic. In a further construction, the occluding area may constitute a polarized piece which functions to occlude left or right lines of sight. In yet another construction, the occluding area may constitute a volume of liquid crystals, which can block or permit vision depending on an electric field applied. These various methods of construction are schematically represented in FIG. 11. A pair of eyeglasses 90 contain a right lens 92a and a left lens 92b. A right occluding area 94a is associated with lens 92a, and a left occluding area 94b is associated with lens 92b. Occluding areas 94a and 94b represent any of the above-mentioned methods of constructing the occluding areas.

Figure 12:
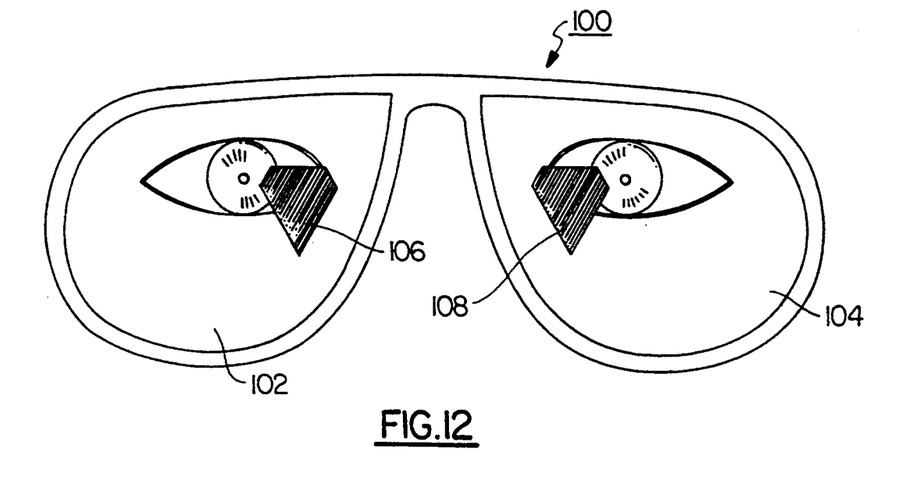
FIG. 12 is a front elevation view, in substantially actual size, of a pair of eyeglasses modified in accordance with the present invention for treating binocular diplopia.

In FIG. 12, there is shown, in substantially actual size, a front elevation view of a pair of eyeglasses 100, modified for treating binocular diplopia. Eyeglasses 100 contain lenses 102 and 104. On lenses 102 and 104, there is affixed partial occluders 106 anad 108 respectively. Occluders 106 and 108 are positioned on lenses 102 and 104 in accordance with the present invention, as described hereinabove with reference to FIGS. 1 and 2 and hereinbelow with reference to FIG. 13. The eyes shown in FIG. 12 are focused along foward lines of sight. FIG. 12 shows an actual arrangement found optimum for a particular person, and is presented as an example.

Figure 13:
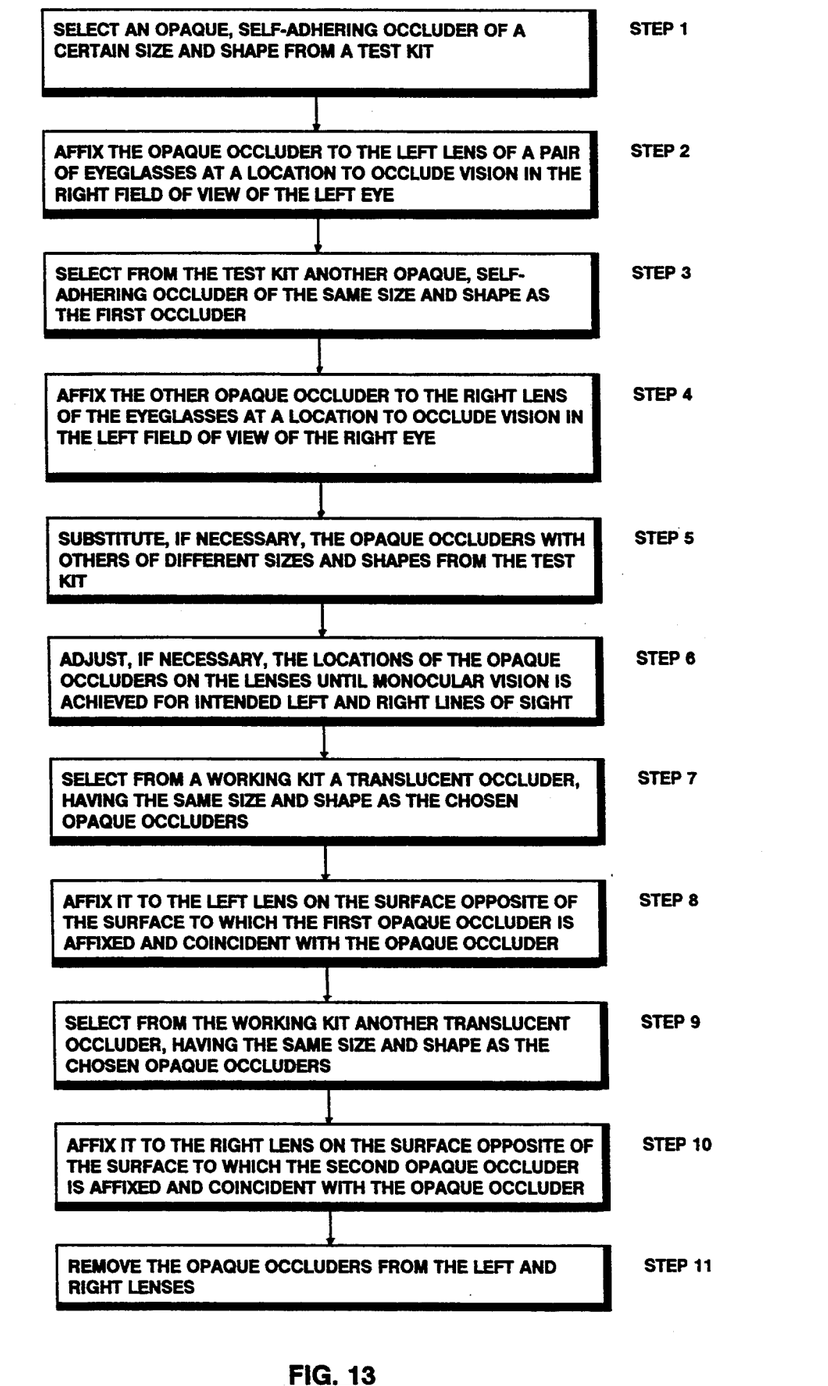
FIG. 13 is a block diagram outlining a method of applying apparatus for treating binocular diplopia in accordance with the present invention.

With reference to FIG. 13, the preferred method of employing test kit 40 and working kit 50 for treating binocular diplopia is herein described. In Step 1, an opaque, self-adhering occluder 48 is selected based on size and/or shape from test kit 40. Selection of the size of the occluder may be based on pupil size and the degree of occlusion desired. Selection of the shape may be based on personal preference or optimum performance. In Step 2, selected occluder 48 is affix to the left lens of a pair of eyeglasses, at a location that will occlude vision in a defined right field of view. A best estimate is made to position occluder 48 at a location on the lens that will occlude vision along an intended line of sight. In Step 3, a second opaque, self-adhering occluder 48, having the same size and shape as the first occluder, is selected from test kit 40. In Step 4, second occluder 48 is affixed to the right lens of the eyeglasses, at a location that will occlude vision in a defined left field of view. Again, a best estimate is made to position the occluder at a location that will occlude vision along an intended line of sight.

If the sizes and shapes of the selected occluders 48 are determined to be unsuitable, after a trial, they can be substituted with a different set of occluders 48 selected from test kit 40, in accordance with Step 5. Once an appropriate size and shape for occluders 48 are determined, the process continues to Step 6. In Step 6, the locations of occluders 48 on the lenses are adjusted, if necessary, until monocular vision is achieved for intended left and right lines of sight.

In Step 7, a translucent, adhesive (or self-adhering) occluder 58 is selected from working kit 50. The size and shape of occluders 58 in working kit 50 are all the same, and have been determined (by experimental use of test kit 40) to be optimum for a particular individual. In Step 8, the first selected occluder 58 is affixed to the left lens, on the surface opposite of the surface to which the first occluder 48 is affixed, and positioned coincident with the position of first occluder 48. In Step 9, a second translucent, adhesive (or self-adhering) occluder 58 is selected from working kit 50. In Step 10, the second occluder 58 is affixed to the right lens, on the surface opposite of the surface to which the second occluder 48 is affixed, and positioned coincident with the position of second occluder 48. Finally, in Step 11, the opaque occluders 48 are removed from the left and right lenses, leaving the desired arrangement of translucent occluders 58 on the eyeglasses.

Figure 14:
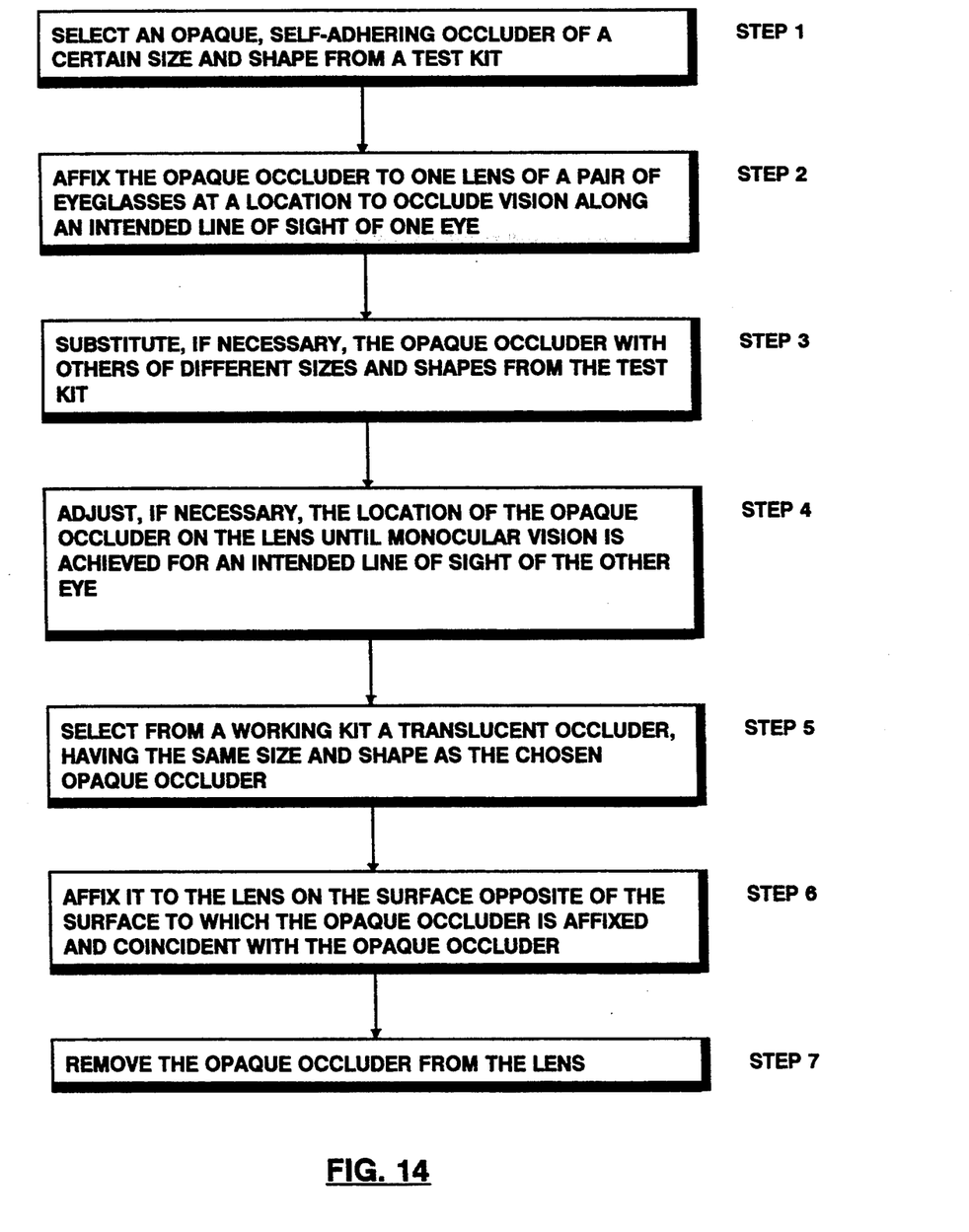
FIG. 14 is a block diagram outlining a second method of applying apparatus for treating binocular or monocular diplopia in accordance with the present invention.

With reference to FIG. 14, the preferred method of employing test kit 40 and working kit 50 for treating binocular or monocular diplopia is herein described. In Step 1, an opaque, self-adhering occluder 48 is selected based on size and/or shape from test kit 40. In Step 2, selected occluder 48 is affixed to one lens of a pair eyeglasses, such as shown in FIG. 10. A best estimate is made to position occluder 48 at a location on the lens that will occlude vision along an intended line of sight. In Step 3, if the size and shape of occluder 48 is determined to be unsuitable, after a trial, it can be substituted with a different occluder 48 selected from test kit 40. This step is performed only if it is necessary to establish, by trial-and-error, the appropriate size and/or shape of occluder 48.

Once an appropriate size and shape for occluder 48 is determined, the process continues to Step 4. In Step 4, the location of occluder 48 on the lens is adjusted, if necessary, until monocular vision is achieved for an intended line of sight of the unoccluded eye. In Step 5, a translucent, adhesive (or self-adhering) occluder 58 is selected from a predetermined working kit 50. In Step 6, the selected occluder 58 is affixed to the occluded lens, on the surface opposite of the surface to which occluder 48 is affixed, and positioned coincident with the position of occluder 48. Finally, in Step 7, the opaque occluder 48 is removed from the occluded lens, leaving the desired translucent occluder 58 on the lens.

While the preferred embodiments of the invention have been particularly described in the specification and illustrated in the drawings, it should be understood that the invention is not so limited. Many modifications, equivalents and adaptations of the invention will become apparent to those skilled in the art without departing from the spirit and scope of the invention, as defined in the appended claims. The present invention is not limited to standard forms of eyeglasses. For example, lenses may be clipped-on or attach to standard eyeglass frames, like clip-on or flip-up sun-shades.

I claim:

1. An apparatus for treating an individual suffering from binocular diplopia comprising:
   a frame, having first and second viewing lenses, and including means for supporting said frame in an operative position relative to the individual such that said first and said second viewing lenses are in front of the left and the right eyes respectively,
   each eye of the individual having a range of vision defined by left and right fields of view which are divided by an imaginary latitudinal plane positioned along a forward line of sight;
   first occluding means, being fixed in a suitable position with respect to said first viewing lens, for occluding a portion of the right field of view of said left eye, said left field of view and said forward line of sight of said left eye being substantially unoccluded; and
   second occluding means, being fixed in a suitable position with respect to said second viewing lens, for occluding a portion of the left field of view of said right eye, said right field of view and said forward line of sight of said right eye being substantially unoccluded,
   whereby monocular vision is substantially achieved alternately between the left eye and the right eye as the eyes scan to the left and to the right respectively.

2. An apparatus as recited in claim 1, wherein said first and said second occluding means comprise respective first and second thin, flexible pieces of material, each of which can occlude vision over at least one line of sight, said first and said second pieces of material being affixed to said first and said second lenses respectively.

3. An apparatus as recited in claim 2, wherein said first and said second pieces of material each constitute a partial occluder.

4. An apparatus as recited in claim 3, wherein each of said partial occluders are translucent.

5. An apparatus as recited in claim 3, wherein each of said partial occluders are opaque.

6. An apparatus as recited in claim 3, wherein each of said partial occluders are in the form of a common geometric shape.

7. An apparatus as recited in claim 6, wherein the common geometric shape is that of a cut diamond.

8. An apparatus as recited in claim 3, wherein each of said partial occluders include an adhesive coating on one side for affixing said partial occluders to said lenses.

9. An apparatus as recited in claim 3, wherein each of said partial occluders are made of a self-adhering plastic material that clings to a lens upon the application of pressure to the material.

10. An apparatus as recited in claim 9, wherein the plastic material is vinyl butyrate.

11. An apparatus as recited in claim 3, wherein each of said partial occluders has a configuration which includes a wide area of occlusion and a narrow area of occlusion.

12. An apparatus as recited in claim 11, wherein each of said partial occluders is substantially in the form of a triangle.

13. An apparatus as recited in claim 11, wherein each of said partial occluders is substantially in the form of a cut diamond.

14. An apparatus as recited in claim 1, wherein said frame constitutes a pair of eyeglasses, and said supporting means of said frame includes a nose bridge and a pair of ear bows.

15. A method of treating an individual suffering from binocular diplopia, in which each eye of the individual has a range of vision defined by left and right fields of view divided by an imaginary latitudinal plane positioned along a forward line of sight, the method comprising the steps of:
  (a) fixing a first partial occluder at a desired operational location with respect to the left eye of the individual;
  (b) fixing a second partial occluder at a desired operational location with respect to the right eye of the individual;
  (c) occluding a portion of the right field of view of said left eye with said first occluder; and
  (d) occluding a portion of the left field of view of said right eye with said second occluder,
  whereby monocular vision is substantially achieved alternately between the left eye and the right eye as the eyes scan to the left and to the right respectively.

16. A method as recited in claim 15, further comprising the step of
  supporting first and second viewing lenses in an operative position relative to the individual such that said first and said second viewing lenses are in front of the left and the right eyes respectively; and
  wherein said first partial occluder is associated with said first viewing lens; and
  wherein said second partial occluder is associated with said second viewing lens.

17. A method as recited in claim 16, wherein said step (a) includes affixing the first partial occluder to the first viewing lens at a location suitable for occluding the desired portion of said right field of view; and wherein said step (b) includes affixing the second partial occluder to the second viewing lens at a location suitable for occluding the desired portion of said left field of view.

18. A method of treating an individual suffering from binocular diplopia, the left and right eyes of the individual each having a range of vision defined by left and right fields of view which are divided by an imaginary latitudinal plane positioned along a forward line of sight, the method comprising the steps of:
  (a) selecting a first self-adhering partial occluder and affixing it to the left lens of a pair of eyeglasses at a location considered suitable for occluding an intended portion of the right field of view of said left eye;
  (b) selecting a second self-adhering partial occluder and affixing it to the right lens of said eyeglasses at a location considered suitable for occluding an intended portion of the left field of view of the right eye; and
  (c) adjusting, if necessary, the locations of said first and said second self-adhering occluders on said left and said right lenses respectively until monocular vision is substantially achieved through said eyeglasses, for intended left and right lines of sight as the eyes scan to the left and to the right respectively.

19. A method as recited in claim 18, further comprising the steps of
  (d) selecting a first adhesive partial occluder;
  (e) affixing said first adhesive occluder to said left lens on a surface opposite of the surface to which said first self-adhering occluder is affixed, and at a location coincident with the location of said first self-adhering occluder;
  (f) selecting a second adhesive partial occluder;
  (g) affixing said second adhesive occluder to said right lens on a surface opposite of the surface to which said second self-adhering occluder is affixed, and at a location coincident with the location of said second self-adhering occluder; and
  (h) removing said first and said second self-adhering occluders from said left and said right lenses.

20. A method as recited in claim 19, wherein said first and said second adhesive occluders are translucent.

21. A method as recited in claim 19, wherein said steps (d) and (f) include selecting said first and said second adhesive occluders from a working kit.

22. A method as recited in claim 18, wherein said first and said second self-adhering occluders are opaque.

23. A method as recited in claim 18, wherein said steps (a) and (b) include selecting said first and said second self-adhering occluders from a test kit.

24. A method of treating an individual suffering from diplopia, comprising the steps of:
  (a) selecting a self-adhering partial occluder of a certain size and configured to include a wide area of occlusion and a narrow area of occlusion;
  (b) affixing said self-adhering occluder to one lens of a pair of eyeglasses at a location considered suitable for occluding an intended line of sight of one eye of said individual;
  (c) adjusting, if necessary, the location of said self-adhering occluder on said one lens until monocular vision is substantially achieved through the other lens of said eyeglasses, for an intended line of sight of the other eye of said individual;
  (d) selecting an adhesive partial occluder having the same size and shape as the self-adhering occluder;
  (e) affixing said adhesive occluder to said one lens on a surface opposite of the surface to which said self-adhering occluder is affixed, and at a location coincident with the location of said self-adhering occluder; and
  (f) removing said self-adhering occluder from said one lens.

* * * * *

UNITED STATES PATENT AND TRADEMARK OFFICE
CERTIFICATE OF CORRECTION

PATENT NO. : 5,452,027
DATED : Sep. 19, 1995
INVENTOR(S) : David E. Tylec

It is certified that error appears in the above-indentified patent and that said Letters Patent is hereby corrected as shown below:

Column 7, line 24
   "he" should read --the--.

Column 10, line 37,
   "can occlude" should read --occludes--.

Signed and Sealed this

Twenty-third Day of January, 1996

Attest:

BRUCE LEHMAN

Attesting Officer        Commissioner of Patents and Trademarks